INVENTORS
BORJE O. ROSAEN
NILS O. ROSAEN
OSCAR E. ROSAEN
BY Hauke, Kraas, & Gifford
ATTORNEYS

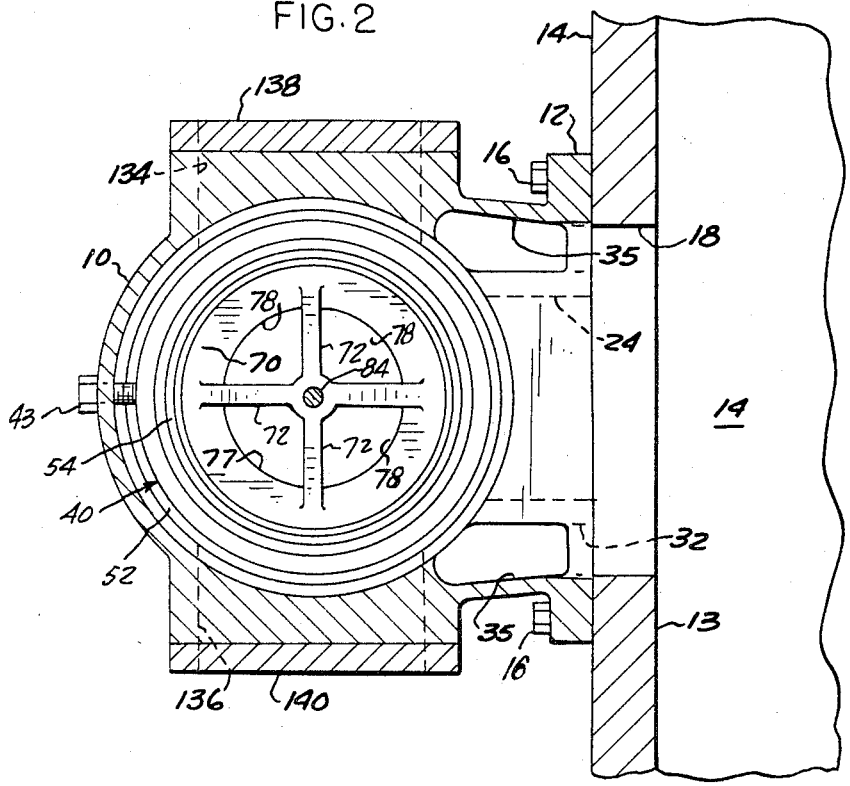

United States Patent Office
3,440,802
Patented Apr. 29, 1969

3,440,802
RESERVOIR FILTER AND INDICATOR
Nils O. Rosaen, Bloomfield Hills, Borje O. Rosaen, Ann Arbor, and Oscar E. Rosaen, Grosse Pointe, Mich., assignors, by mesne assignments, to Parker-Hannifin Corporation, Cleveland, Ohio, a corporation of Ohio
Continuation-in-part of application Ser. No. 522,773, Jan. 24, 1966. This application Aug. 1, 1966, Ser. No. 569,488
Int. Cl. B01d *35/12, 25/34*
U.S. Cl. 55—199                          15 Claims

ABSTRACT OF THE DISCLOSURE

A filter device is adapted to be mounted to the exterior of a sidewall of a fluid reservoir and includes a housing section having a fluid inlet connected with the reservoir and a fluid outlet. The housing section defines a filter chamber fluidly intermediate the inlet and the outlet and disposed below the fluid level of the reservoir. A tubular section extends upwardly from the housing section and a filter element is vertically slidably disposed in the filter chamber. A rod extending upwardly from the filter element provides a means for withdrawing the filter element upwardly from the filter chamber.

---

This invention relates to filtering devices and more particularly to an improved filter device constructed to permit continued operation of the system to which the device is connected while the filter element is being removed for cleaning or replacement. This application is a continuation-in-part of our copending application Ser. No. 522,773, filed Jan. 24, 1966.

Heretofore a number of filter devices have been provided in the prior art to permit continued operation of the fluid system while the filter element is being removed for purposes of cleaning or replacement. Each of these has included some type of valve means operable upon being actuated to close off portions of the filter device and to redirect fluid directly from the inlet to the outlet. Such valve means in addition to adding considerable cost to the filter devices by being expensive to manufacture and assemble also are subject to malfunction. When the valve means become worn or when the malfunction occurs without advance warning, removal of the filter element from the open end of the device results in fluid spillage necessitating a difficult and time consuming clean up operation.

The primary purpose of the improved filter device as disclosed in my aforementioned copending application and the present invention is to provide a filter device constructed to permit continued operation of the fluid system as the filter element is being removed for cleaning or replacement. The improved filter device does not require valve means for this purpose so that a substantial reduction in initial cost is achieved. Furthermore, the improved filter device obviates the danger of loss of system fluid resulting from malfunction of conventional valve means.

The preferred embodiment of the present invention which produces this improved functional performance, which will be subsequently described in detail, comprises a housing section having a fluid inlet adapted for connection to a reservoir of the fluid system and a fluid outlet. The housing section defines a filter chamber fluidly intermediate the inlet and the outlet and vertically disposed below the fluid level of the reservoir. A tubular section forms a vertical extension of the filter chamber and terminates upwardly at a level above the normal fluid level of the system. The filter element is vertically slidably disposed in the filter chamber and carries an elongated rod which extends up through the tubular member and provides a means for withdrawing the filter element upwardly from the filter chamber. As the filter element is being withdrawn from the filter chamber the fluid flow continues from the inlet through the section of the filter chamber evacuated by the filter element to the outlet thereby providing a continual fluid flow during the withdrawing operation.

During the normal filtering operation of the improved filter device, the filter element becomes clogged as it removes foreign matter from the system fluid. The clogged condition of the filter element produces a pressure differential between the fluid inlet and the fluid outlet and across the filter element. This pressure differential produces a vertical upward movement of the filter assembly until it has moved a distance sufficient to perimt a direct fluid flow from the inlet through the filter chamber bypassing the filter element and then through the outlet. Preferably, the filter element, as it gradually moves vertically upwardly, causes the upper end of the elongated stem to actuate visual indicating means provided on the upper section of the tubular member and which indicate the filtering condition of the filter element.

Another feature of the improved construction provides for an automatic purging of air which might otherwise collect in the device. This purging is accomplished without expensve air evacuation means and takes place substantially continuously during operation of the system so that large air bubbles which would otherwise accumulate are not suddenly thrown into the system to interfere with the operation of the other components of the system.

Still another feature of the improved device of the present invention is the provision for a sight glass in the structure defining the vertical extension of the filter chamber. The sight glass is provided at a height from the filter chamber establishing a minimum oil level in the reservoir. This minimum oil level is defined at a height sufficient to prevent air from being discharged from the filter chamber to the filter outlet. The sight glass therefore provides a visual indication for determining when additional oil must be supplied to the fluid system.

It is an object then of the present invention to reduce the cost of continuous fluid flow systems by providing a filter device for such systems constructed to permit the filter element to be removed for cleaning or replacement without interrupting the operation of the system and without the necessity of providing valve means within the filter device for redirecting fluid flow as the filter element is removed.

It is another object of the present invention to improve the functioning of those filter devices having means for permitting the removal of the filter element without interrupting the operation of the fluid system by providing a new filter device adapted to automatically direct the fluid from the inlet to the outlet during the removal of the filter element without requiring the provision of valve means for this purpose.

It is yet another object of the present invention to improve the filter devices of the aforementioned types by providing an improved means for indicating the clogged condition of the filter element of such devices, and also means for automatically bypassing the filter element when it has become clogged to a predetermined degree.

Still another object of the present invention is to improve the operation of fluid systems by providing a filter device constructed to continuously remove air from within the device.

A still further object of the present invention is to reduce the possibility of air being introduced into fluid systems through the filter device and caused by the oil level of the system falling below the outlet of the filter device by providing visual indicating means effective for indicating that the oil level has fallen below an established minimum level.

Still further objects and advantages of the present invention will readily occur to one skilled in the art to which the invention pertains upon reference to the following detailed description. The description makes reference to the accompanying drawings in which like reference characters refer to like parts throughout the several views and in which:

FIG. 2 is a sectional view taken along lines 2—2 of FIG. 1;

FIG. 3 is a fragmentary view as seen substantially from lines 3—3 of FIG. 1;

Figure 1:
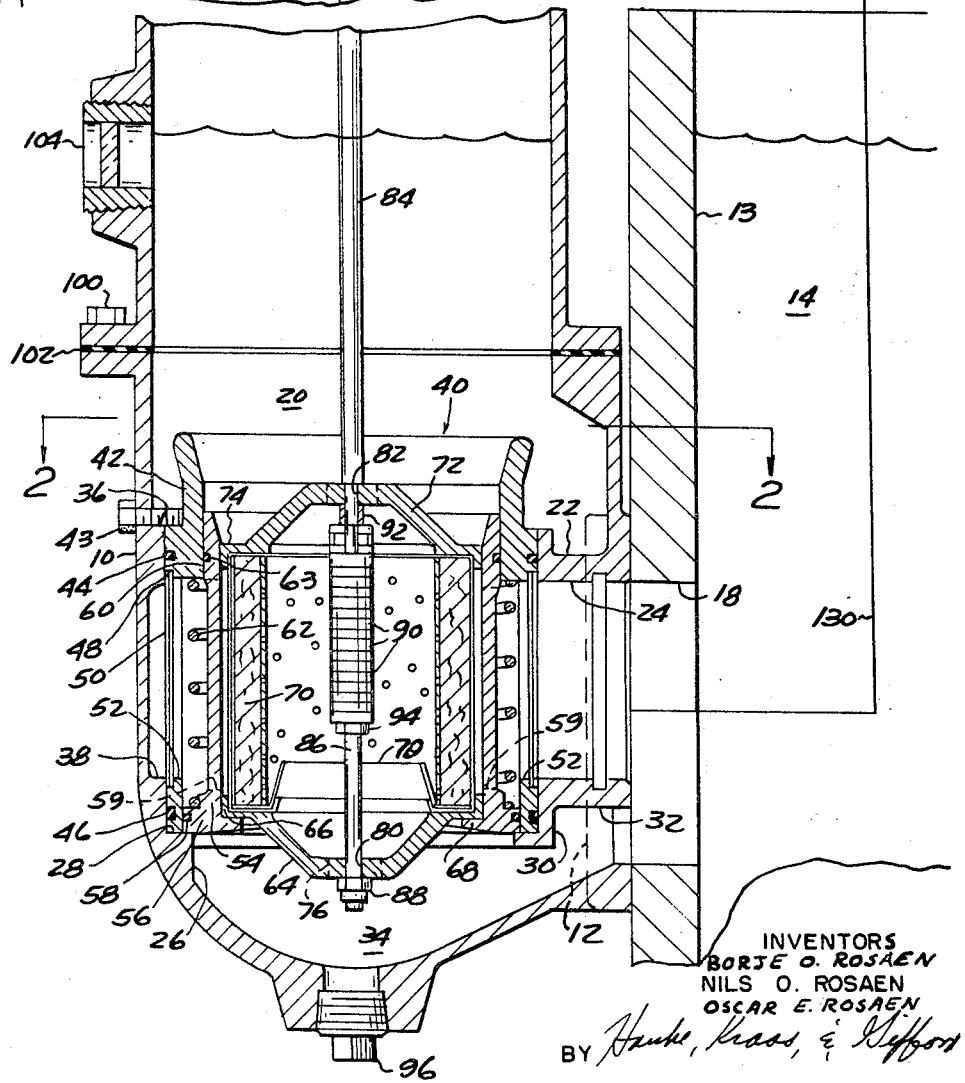
FIG. 1 is a longitudinal cross sectional view of a preferred filter device of the present invention mounted to a fluid reservoir and illustrating other preferred components of the system schematically.

Now referring to the drawings, FIGS. 1 and 2 illustrate a preferred filter device as comprising a housing member 10 having a rectangular flange 12 mounted to the exterior surface of wall 13 of a reservoir 14 by a plurality of threaded fasteners 16.

The wall 13 of the reservoir 14 is provided with a preferably circular opening 18 which is disposed below the normal working level of the fluid in the reservoir. The opening 18 is encompassed by the flange mounting surface of the housing member 10.

The housing 10 is internally cored to define an open topped chamber 20. An annular section 22 defines an outlet 24 fluidly connecting the chamber 20 with the reservoir 14.

A rib 26 extending around the lower wall portion of the housing 10 defines a horizontal annular seat 28. The seat 28 is connected to the annular section 22 by a short arcuate vertical wall section 30.

The housing 10 defines a substantially U-shaped inlet opening 32 which encompasses the annular section 22 and is fluidly connected with a bottom chamber section 34.

It can thus be seen that the annular section 22 including the wall section 30 separates the outlet from the inlet opening 32. The inlet opening 32, as can best be seen in FIG. 2, is fluidly connected through a pair of substantially vertical passages 35 to the upper section of the filter chamber 20.

An upper annular rib 36 cooperates with a lower annular rib 38 formed adjacent the seat 28 to provide a vertical guideway for a filter assembly generally indicated at 40. The lower annular rib 38 is integrally connected with the wall section 30 adjacent the lower portion of the annular section 22 and the upper rib 36 extends around from the upper portion of the annular section 22.

The filter assembly 40 includes an outer cylindrical member 42 which has its lower end normally disposed on the seat 28. A hold-down bolt 43 retains the member 42 in this seated position. The member 42 is provided with an upper O-ring seal 44 which engages the upper rib 36 and a lower O-ring seal 46 which engages the lower rib 38. The outer cylindrical member 42 is provided with a circumferential recess 48 in which is disposed a cylindrical filtering mesh element 50. The cylindrical member 42 is also provided with a plurality of circumferential apertures 52 which provide fluid communication between the inner volume defined by the cylindrical member 42 and its exterior surface.

An inner cylindrical member 54 is provided with a lower end section radially enlarged to form an annular flange 56 which is also disposed on the seat 28. The flange 56 preferably has a diameter corresponding to the inner diameter of the lower end of the cylindrical member 42 and carries a piston ring 58 which slidably engages the inner surface of the lower end of the cylindrical member 42. The inner cylindrical member has a plurality of circumferential openings 59 permiting fluid communication between the interior and exterior sides of the member 42.

It is to be understood that normally the cylindrical member 42 is stationary relative to the housing 10. The cylindrical member 52 has a narrowed inner circumference as at 60 to provide an annular seat for the upper end of a coil spring 62 disposed between the inner cylindrical member 54 and the outer cylindrical member 42. The spring is seated at its lower end against the flange 56 of the inner cylindrical member so that the inner cylindrical member 54 is normally biased downwardly against the seat 28.

The upper outer surface of the inner cylindrical member 54 is guided for vertical sliding movement within the outer cylindrical member 42 by a piston ring 63.

The filter assembly further comprises a lower member 64 having an annular shoulder section 66 which is seated on an inner circumferential flange portion 68 provided at the lower end of the inner cylindrical member 54. A cylindrical filter element 70 is sandwiched between the lower member 64 and an upper member 72 having a configuration similar to the lower member 64 and which includes an annular shoulder section 74 having a diameter corresponding to the inner diameter of the inner cylindrical member 54.

The lower member 64 includes a plurality of annularly spaced openings 76 which permit fluid communication between the lower chamber section 34 and the interior of the filter element 70. Similarly the upper member 72, as can best be seen in FIG. 2, is provided with a plurality of annular openings 77 which permit fluid communication between the upper section of the chamber 20 and the interior of the filter element 70.

Referring back to FIG. 1, the filter element 70 is provided with a meshed frusto-conical shaped section 79 forming a part of its inner lower end. As the filter assembly 40 is moved upwardly through the fluid, the force of the fluid acting on the filter tends to wash the foreign particles downwardly from the interior of the element where it is collected by the section 79. It can be seen that the section 79 prevents the foreign particles from escaping back into the outlet 24 so that they are removed from the system with the filter assembly 40.

The lower member 64 is provided with an axial opening 80 which is preferably formed on the axis of the filter element 70. The upper member 72 is provided with an opening 82 which is vertically axially aligned with the opening 80 in the lower member 64.

A rod 84 has a reduced diameter threaded section 86 which extends through the upper opening 82, the filter element 70 and through the lower opening 80 a distance sufficient to permit a lock nut 88 to be threadably attached thereon thereby securing the lower member 64, the filter element 70, and the upper member 72 to the rod 84. The narrowed threaded section 86 of the rod 84 further carries a plurality of magnets 90 which are spaced from the upper member 72 by a bushing 92 and locked together by a nut 94.

The housing 10 further includes a drain plug 96 provided for the purpose of removing sediment and other foreign matter that may accumulate in the lower portion of the lower chamber section 34. The drain plug 96 permits removal of accumulated sediment even while the system fluid is flowing through the filter assembly 40.

An elongated tubular member 98 is fastened to the upper open end of the housing 10 by a plurality of annularly spaced threaded fasteners 100. A seal member 102 is preferably disposed between the flanges of the tubular member 98 and the upper ends of the housing 10.

The tubular member 98 has an inner diameter sufficient to accommodate the outer diameter of the outer cylindrical member 42 so that the cylindrical member 42 can be inserted into and withdrawn from the housing 10 through the tubular member 98.

As can best be seen in FIG. 1, a sight glass 104 is provided in a wall of the tubular member 98 and above the filter chamber 20. The sight glass 104 is preferably disposed at a height corresponding to a minimum fluid level in the system. This level is above the fluid outlet 24 so that air will not be introduced to the system through the outlet 24.

The upper end of the rod 84 is threaded as at 124 and carries a knob element 126 which is vertically adjustable to abut the lower end of a rod 116. The knob is adjusted so that when the filter assembly is seated against the flange 68, the enlarged end 118 of the rod 116 rests on the seat 114 of the cap 106.

Now as the invention has thus far been described, fluid is normally drawn from the reservoir 14 by a pump 128 through the inlet 32 which produces a flow through the lower chamber section 34 and up through the interior of the filter element 70, and also through the passages 35 to the upper section of the chamber 20 and down through the interior of the filter element 70. The fluid then flows in filtering relationship horizontally through the filter element 70 and out through the outlet 24 to a conduit 130 for discharge to a fluid user 132. The conduit 130 preferably is disposed in the reservoir 14 as illustrated.

The preferred filter device, as can best be seen in FIG. 2, can also be adapted to the suction side of a pump through either one or both of a pair of side outlets 134 and 136 which are in fluid communication with the exterior side of the filter element 70, but for purposes of description are shown as capped by members 138 and 140.

As the filter element 70 becomes clogged, it produces a pressure differential across the inlet 32 and the outlet 34. This increased inlet pressure is reflected in the lower chamber section 34 and acts against the lower surface of the flange 56 of the inner cylindrical member 54. This upward force on the inner cylindrical member 44 gradually increases to the point where it overcomes the normal downward urging of the spring 62 so that the filter element 70, the upper member 72, and the lower member 64, are carried by the inner cylindrical member 54 vertically upwardly. The spring member 62 is chosen of a stiffness sufficient to correspond to a predetermined clogged condition of the filter element so that when the filter element 70 reaches this clogged condition, the inner cylindrical member will have risen a vertical distance sufficient to clear the openings 52 in the outer cylindrical member 42 thereby permitting a direct fluid flow from the lower filter chamber section 34 to the outlet 24 thus bypassing the filter element 70.

Now it can be seen that as the filter element 70 becomes clogged, thereby producing a fluid-pressure differential sufficient to move the inner cylindrical member 54 vertically upwardly, the knob 126 is carried upwardly to move the rod 116 upwardly against the force of the spring 122. The retainer 120 is provided with an annular flange 142 which has a radial slot 144 formed inwardly from its circumferential edge. The slot 144 is engaged with an actuating member 146 having a uniform twist and which is carried by a vertical pin 148 supported for rotation in the cap 106. As the retainer 120 is forced upwardly by the movement of the filter assembly, the sides of the slot 144 act on the actuating member 146 to produce a rotation of the pin 148. The upper end of the pin 148, as can best be seen in FIG. 3, carries a pointer element 150 which traverses the upper surface of cap 106. The pointer 150 is associated with a plurality of indicia 152 which correspond to the rotation of the pin 148. Since the degree of rotation of the pin 148 is associated with the movement and therefore the condition of the filter assembly, the indicia 152 correspond to this degree of rotation and visually indicate the condition of the filter element 70.

The cap 106 carries a downwardly depending guide pin 154 which registers in an opening 156 provided in the flange 142 to stabilize the retainer 120. The cap 106 is further provided with an air passage 158 which permits air movement into and out of the filter device to accommodate changing fluid levels.

When the filter element 70 has become clogged to a degree requiring that it be removed for purposes of either cleaning or replacement, the cap 106 is removed while the fluid system continues to operate. The knob 126 is grasped to pull the filter 70 vertically upwardly through the tubular member 98. Thus a removal of the filter element 70 is accomplished by simply lifting the filter element 70 from active filtering engagement with the fluid within the housing 10. It can be seen that this removal does not disturb the operation of the fluid system since fluid will continue to pass from the inlet passage 32 to the outlet passage 24.

Air which might tend to be introduced into this system during removal and reinsertion of the filter element rises to the top of the tubular section 98 and escapes from the system.

Figure 4:
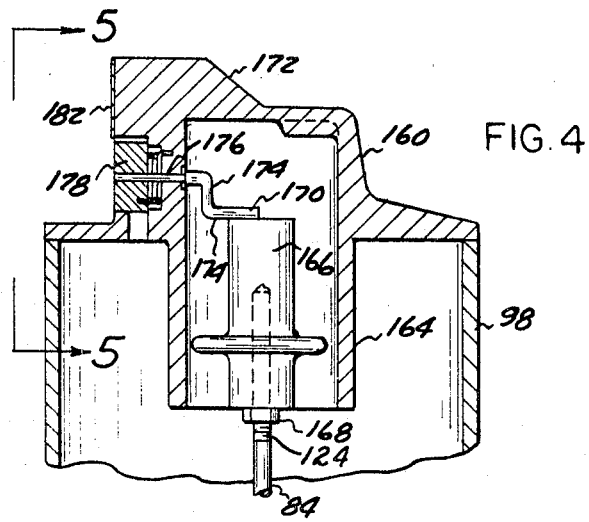
FIG. 4 is a fragmentary cross-sectional view of a modification of the upper section of the preferred embodiment of the present invention for indicating the filtering condition of the filter element.
Figure 5:
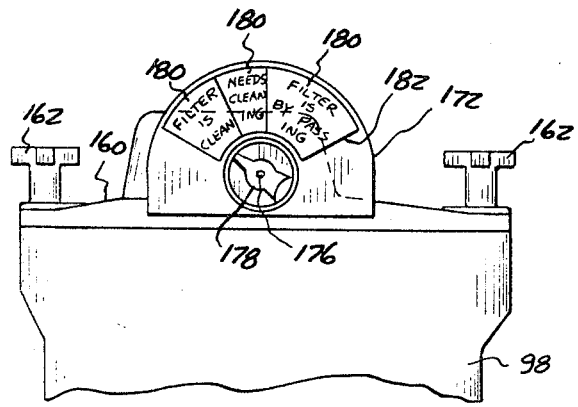
FIG. 5 is a fragmentary view as seen substantially from lines 5—5 of FIG. 4.

An alternate embodiment of the filter visual indicating means is illustrated in FIGS. 4 and 5 and comprises a modified cap 160 which closes off the upper end of the tubular member 98 and is removably secured thereto by a plurality of threaded fasteners 162.

The cap 160 includes an inner downwardly depending cylindrical section 164 which encompasses the upper end of the rod 84. An elongated knob 166 is carried on the threaded end 124 of the rod 84 and locked thereon by a nut 168.

The upper end of the knob 166 is adjusted to engage an actuating pin 170 which is horizontally journalled for rotation in a boss portion 172 of the cap 160. The inner end of the pin 170 is provided with a pair of right angle bends 174 so that a vertical movement of the knob 166 produces a rotation of pin 170.

The outer end of the pin 170 is reduced as at 176 and carries a pointer 178 at the extreme end thereof. The pointer 178 is disposed in a recessed portion of the boss 172 and points to suitable indicia 180 provided on an indicator plate 182. The pointer element 178 rotates with the pin 170 and thus with suitable indicia 180 indicates the condition of the filter element 70 by indicating the position of the filter assembly 40.

Novel means are also provided in the present invention for continuously separating bubbles of air which often are carried in the system fluid. These bubbles normally are attracted to the surface of the components of the system and tend to cling to such surfaces.

Figure 6:
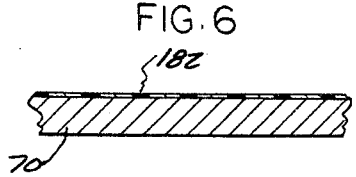
FIG. 6 is an enlarged fragmentary sectional view of the filter element.

As can best be seen in FIG. 6, the filter element 70 is preferably coated with a microscopically thin layer 182 of a Teflon plastic or tetrafluoroethylene resin. The Teflon resin is normally applied to a conventional filter element initially in a liquid vehicle by spraying, hand coating or the like to provide a coating having a smooth surface.

The treated surface of the filter element 70 prevents the bubbles of air carried in the system fluid from clinging thereto as is the case with uncoated filter elements. The bubbles of air in the fluid upon engaging the filter element 70 tend to rise to the surface of the fluid and separate therefrom.

Figure 7:
FIG. 7 is an enlarged fragmentary sectional view of an alternative filter element.

This tendency of the bubbles of air to rise to the surface upon impinging against the Teflon coated filter element 70 is not restricted to a coated surface. For instance, FIG. 7 illustrates the filter element 70 as being fabricated of a nylon material. The nylon filter element 70 also causes bubbles of air carried in the system fluid to rise to the surface of the moving fluid rather than to cling to the filter element 70.

It can therefore be seen that metallic filter elements coated with selected materials such as a Teflon resin and selected noncoated nonmetallic filter elements will produce the aforementioned separation of air bubbles from the fluid system. Such selected coatings and materials are characterized by the property that they have a lesser force of adhesion with the bubbles of air than exists between the bubbles and the fluid in which they are carried. Since the bubbles are not attracted by the structure through which they are passing, the natural forces of buoyancy carries the bubbles to the surface of the fluid where they escape from the fluid.

It is apparent that the construction of the present invention which has been described provides a filter device in which the filter element can be readily changed or cleaned without interrupting the operation of the fluid system. The device, unlike previous similar devices, does not require extensive valve means which are subject to malfunction and which often create difficult cleanup operations produced by an inoperative device.

It is also apparent that although we have described but one embodiment of our invention, many changes can be made therein without departing from the spirit of the invention as expressed by the scope of the dependent claims.

We claim:

1. In a fluid system having a fluid reservoir adapted to contain fluid at a predetermined level, a filter device comprising:
   (a) a first housing portion mounted to said reservoir below the level of fluid therein having an inlet connected to said fluid reservoir and an outlet, said inlet and outlet being below said level,
   (b) a second housing portion connected with said first housing portion and having a vertically elongated chamber extending a distance above said level,
   (c) a filter assembly including a cylindrical filter element carried in said first housing portion and being concentric with said chamber so that the filter assembly is vertically removable from said second housing portion,
   (d) means connecting said inlet with said chamber on one side of said filter element, and
   (e) means connecting said outlet with the opposite side of said filter element, 2. The filter device as defined in claim 1 and including pressure responsive means having one side exposed to the pressure of fluid on the inlet side of said filter element and having a side opposite to said first side exposed to the pressure of fluid on the outlet side of said filter element and being movable in response to a predetermined increase in the pressure differential across the filter element to a position opening a bypass from said inlet to the fluid outlet of said device.

3. The filter device as defined in claim 1, including pressure responsive means having one side exposed to the pressure of fluid on the inlet side of said filter element and a second opposite side exposed to the pressure of fluid on the outlet side of said filter element and being movable in response to a change in the pressure differential across said filter element, and means operably connected to said pressure responsive means to visually indicate the position of said pressure responsive means exteriorly of said filter device.

4. The filter device as defined in claim 3, including means actuated by movement of said pressure responsive means to open a fluid path from said inlet directly to said outlet upon a predetermined variation in the pressure differential across said filter element.

5. The filter device as defined in claim 1, wherein said filter assembly further comprises:
   (a) a first flanged member, a second flanged member with said cylindrical filter element disposed therebetween;
   (b) one of said flanged members having an opening in fluid communication with the interior of said reservoir and the interior of said filter element; and
   (c) means provided in said housing directing the fluid from the exterior surface of said filter element to said outlet.

6. The filter device as defined in claim 1, wherein said filter assembly further comprises
   (a) a pair of spaced apart flange members and said cylindrical filter element disposed therebetween; and
   (b) means provided in said filter chamber defining a seat for one of said flange members, said means vertically slidably disposed within said filter chamber and movable in response to the condition of said filter element between a first position associated with a first filter condition wherein the fluid is directed from said inlet through said filter element and through said outlet, and a second position associated with a second condition of said filter element wherein the fluid is directed from said inlet to said outlet and bypassing said filter element.

7. The filter device as defined in claim 6, including a vertical elongated stem member carried by said filter assembly, said stem member extending upwardly through said tubular member, and visual indicating means operably associated with the upper end of said stem and actuated by the movement of said stem to indicate the vertical position of said filter assembly.

8. The filter device as defined in claim 6, wherein said last mentioned means comprises:
   (a) an annular seat provided in said chamber;
   (b) a cylindrical member normally disposed on said seat;
   (c) guide means associated with said cylindrical member to permit vertical movement thereof toward and away from said seat in response to variations in fluid pressure imposed on horizontal surfaces of said cylindrical member, said fluid pressure variations corresponding to a variable related to the filtering condition of said filter element; and
   (d) means carrying said filter element within said cylindrical member so that said filter element moves in combination with said cylindrical member in response to the variation in said fluid pressure.

9. The filter device as defined in claim 8, including means operably connected to said flange members to visually indicate the vertical position of said filter element.

10. The filter device as defined in claim 1, in which said inlet and said outlet are provided on a common side of said housing.

11. The filter device as defined in claim 1, including means carried by said filter assembly for separating magnetically attractive particles from the system fluid.

12. The filter device as defined in claim 1, including means for indicating the fluid level of said fluid system.

13. The filter device as defined in claim 1, including means for separating globules of a gas carried in said fluid, said means comprising:
   (a) structure associated with said housing and presenting a nonadherent surface area exposed to the fluid delivered therethrough;
   (b) said non-adherent surface characterized by the property of having a lesser force of adhesion with said globules of gas than exists between said globules and said liquid so that said globules upon engaging said structure tend to rise to the surface of said fluid.

14. The filter device as defined in claim 13, wherein a section of said filter assembly is coated with a layer of tetrafluoroethylene resin.

15. The filter device as defined in claim 13, wherein said structure is formed of a nylon resin.

(References on following page)

References Cited

UNITED STATES PATENTS

| | | | | |
|---|---|---|---|---|
| 1,793,080 | 2/1931 | Glover | | 210—236 |
| 1,817,572 | 8/1931 | Linley et al. | | 210—172 |
| 2,358,748 | 9/1944 | Thompson | | 210—172 |
| 2,795,332 | 6/1957 | Burla | | 210—172 X |
| 3,288,290 | 11/1966 | Rosaen | | 210—90 |

SAMIH N. ZAHARNA, *Primary Examiner.*

U.S. Cl. X.R.

116—70; 210—90, 172, 238